United States Patent [19]

Milliren et al.

[11] Patent Number: 5,405,886
[45] Date of Patent: Apr. 11, 1995

[54] SYSTEM FOR THE PRODUCTION OF TOLUENE DIISOCYANTE BASED FLEIXLBE FOAMS AND THE FLEXIBLE FOAMS PRODUCED THEREFROM

[75] Inventors: Charles M. Milliren, Coraopolis; James R. Gricar, Washington, both of Pa.

[73] Assignee: Miles Inc., Pittsburgh, Pa.

[21] Appl. No.: 238,561

[22] Filed: May 5, 1994

Related U.S. Application Data

[63] Continuation of Ser. No. 609,674, Nov. 6, 1990, abandoned.

[51] Int. Cl.$^6$ ............................................. C08G 18/06
[52] U.S. Cl. ...................... 521/163; 521/118; 521/128; 521/129; 521/155; 521/159; 521/164; 521/167; 521/170; 252/182.24; 252/182.26; 252/182.27; 252/182.28; 252/182.34
[58] Field of Search .............. 521/129, 163, 159, 155, 521/167, 164, 118, 128, 170; 252/182.24, 182.26, 182.27, 182.28, 182.34

[56] References Cited

U.S. PATENT DOCUMENTS

| | | |
|---|---|---|
| 3,067,148 | 12/1962 | Sandridge et al. . |
| 3,948,825 | 4/1976 | Pray . |
| 4,040,992 | 8/1977 | Bechara et al. ................ 521/117 |
| 4,141,862 | 2/1979 | Raden et al. ................... 521/129 |
| 4,569,952 | 2/1986 | Radovich et al. .............. 521/167 |
| 4,582,861 | 4/1986 | Galla et al. .................... 521/118 |
| 4,707,501 | 11/1987 | Petrella et al. ................. 521/129 |
| 4,767,736 | 8/1988 | Petrella ......................... 502/164 |
| 4,845,133 | 7/1989 | Priester, Jr. et al. ........... 521/167 |
| 4,902,723 | 2/1990 | Baker et al. .................... 521/129 |

FOREIGN PATENT DOCUMENTS

| | | |
|---|---|---|
| 350868 | 1/1990 | European Pat. Off. . |
| 3125402 | 1/1983 | Germany . |
| 1389932 | 4/1972 | United Kingdom . |

OTHER PUBLICATIONS

Bechara et al "Unusual Catalysts for Flexible Urethane Foams" Dec. 1978 pp. 24–36.

*Primary Examiner*—John Kight, III
*Assistant Examiner*—John M. Cooney, Jr.
*Attorney, Agent, or Firm*—Joseph C. Gil; N. Denise Brown

[57] ABSTRACT

The present invention is directed to an isocyanate reactive mixture and the flexible polyurethane foam produced therefrom. The reactive mixture contains specific filled polyols, water, a catalyst for the reaction between an isocyanate group and a hydroxyl group, and a specific N-hydroxyalkyl quaternary ammonium salt. The isocyanate used is toluene diisocyanate.

8 Claims, No Drawings

SYSTEM FOR THE PRODUCTION OF TOLUENE DIISOCYANTE BASED FLEIXLBE FOAMS AND THE FLEXIBLE FOAMS PRODUCED THEREFROM

This application is a continuation, of application Ser. No. 07/609,674 filed Nov. 6, 1990, which is now abandoned.

BACKGROUND OF THE INVENTION

N-hydroxyalkyl quaternary ammonium salts corresponding to the following general formula:

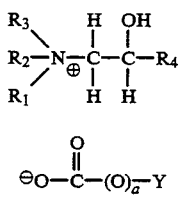

are known. See. e.g., U.S. Pat. Nos. 4,040,992 and 4;582,861. The '992 patent discloses that such catalysts can be used to promote the trimerization of isocyanates, and can be used in formulations for producing polyurethanes, polyurethanepolyisocyanurates and polyisocyanurates. The reference does set forth one specific flexible foam formulation based on toluene diisocyanate and a glycerine/propylene oxide polyether (note Example 23), although no properties for the resultant foam are set forth.

In addition, the art has suggested the use of various trimerization catalysts in preparing flexible polyurethane foams. U.S. Pat. No. 4,767,736 describes a catalyst package consisting essentially of a) triethylene diamine, b) 4-(2-dimethylaminoethyl)morpholine, c) N,N,N',N'-tetramethyl-1,2-diamino-2-methylpropane, d) bis(dimethylaminoethyl)ether, and e) an N-hydroxyalkyl quaternary ammonium acid salt. Such a package is described as eliminating cure drift in foams prepared from one type of 'filled' polyol. U.S. Pat. Nos. 4,141,862 and 4,902,723 describe the use of 1,3,5-tris(3-dimethylaminopropyl)-s-triazine in flexible polyurethane foams.

British Patent 1,389,932 describes the use of trimerization catalysts in general and specifically exemplifies the use of potassium acetate in the production of a flexible foam from conventional polyethers. Finally, in Bechara et al, "Unusual Catalysts for Flexible Urethane Foams", Proc. S.P.I. Annual Urethane Div. Tech. Conf., 1978, pages 24 through 36, trimethyl hydroxyethyl ethylene diamine (Dabco T) and Dabco TL were described as useful in producing flexible foams from filled polyethers.

Flexible and high resilience ("HR") polyurethane foams based on toluene diisocyanate are known. In producing such HR foams, it is common in the art to use "filled" polyols such as i) polymer polyols or ii) dispersions of polyureas and/or polyhydrazodicarbonamides. When such filled polyols are used, however, it is necessary to utilize various crosslinkers, such as diethanolamine, in order to achieve foam stability. Without the use of such crosslinkers, HR foams collapse prior to gel and are accordingly not usable. By stabilizing with crosslinkers, suitable foam products are formed. While such crosslinkers typically improve foam stability and in some cases improve compression set properties, they also adversely affect strength properties, such as tensile strength, tear strength, and elongation.

Various low molecular weight crosslinkers are used in the manufacture of flexible foams. U.S. Pat. No. 3,067,148 describes the use of tetrahydric compounds derived from ethylene diamine and alkylene oxides. U.S. Pat. No. 3,948,825 describes the use of reaction products of methylene dianiline and alkylene oxides. U.S. Pat. No. 4,569,952 describes the use of an addition product of an alkylene oxide and an aromatic di amine and a mixture of the addition product with an alkanolamine. Finally, U.S. Pat. No. 4,845,133 describes flexible polyurea or polyurea polyurethane foams prepared from high equivalent weight amine terminated compounds and crosslinkers and/or chain extenders.

It was an object of the present invention to produce a flexible polyurethane foam from toluene diisocyanate and a filled polyol which foam was at least as stable as those foams produced using conventional cross linkers and which foam had superior strength properties to those foams produced using conventional cross linkers.

DESCRIPTION OF THE INVENTION

The present invention is directed to a flexible foam prepared by reacting:
A) a polyol consisting of
  1) from 20 to 100%, and preferably from 50 to 80%, by weight of a polyol selected from the group consisting of:
    a) a dispersion of a polyurea and/or a polyhydrazodicarbonamide in a relatively high molecular weight organic compound containing at least two hydroxyl groups,
    b) a polymer polyol prepared by polymerizing an ethylenically unsaturated monomer or monomers in a relatively high molecular weight organic compound containing at least two hydroxyl groups, and
    c) mixtures thereof, and
  2) from 0 to 80%, and preferably from 20 to 50%, by weight of one or more polyether polyols having hydroxyl funtionalities of from 2 to 3, said percents by weight being based on the combined weight of components 1) and 2) and totalling 100%,
B) water, in an amount of from about 1.5 to about 7 parts, and preferably from 2.0 to 4.5 parts by weight per 100 parts by weight component A), and
C) toluene diisocyanate, at an isocyanate index of from about 80 to about 120 (preferably from 90 to 110) in the presence of
D) a catalytic amount, and preferably from 0.005 to 1.5% by weight based on the amount of component A), of a catalyst which will catalyze the reaction between an isocyanate group and an hydroxyl group, and
E) from about 0.05 to about 2.0 parts by weight, and preferably from 0.05 to 1.0 parts and most preferably from 0.3 to 0.7 parts by weight per 100 parts by weight of component A) of an N-hydroxyalkyl quaternary ammonium salt corresponding to the following general formula:

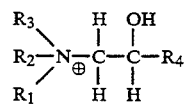

-continued

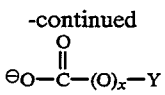

wherein x is 0 or 1, $R_1$, $R_2$, and $R_3$ are independently $C_1$ to $C_{20}$ alkyl or hydroxyalkyl groups, $C_3$ to $C_8$ cycloalkyl groups, $C_7$ to $C_{20}$ aralkyl groups, $C_6$ to $C_{20}$ aryl groups, $C_2$ to $C_{20}$ alkenyl groups, or $C_2$ to $C_6$ alkenyl groups, or, $R_1$, $R_2$, and $R_3$ together constitute a heterocyclic structure from the group consisting of triethylene diamine, methyl triethylene diamine, quinuclidine, N-methyl morpholine, N-ethyl morpholine, and N'N'-dimethyl piperazine, $R_4$ is H, phenyl, a $C_1$ to $C_{15}$ alkyl group, a $C_2$ to $C_{15}$ alkenyl group, a $C_2$ to $C_6$ alkenyl group, a $C_1$ to $C_9$ hydroxyalkyl group, a keto alkyl group having a total of 3 to 15 carbon atoms, or an alkoxylalkyl group having a total of 2 to 20 carbon atoms, Y is H, a $C_1$ to $C_{20}$ alkyl group, a $C_2$ to $C_{15}$ alkenyl group, a $C_3$ to $C_6$ cycloalkyl group, phenyl, an alkyl phenyl having 1 to 9 carbon atoms in the alkyl group, benzyl, an alkyl benzyl having 1 to 9 carbon atoms in the alkyl group, or a $CH_{(3-n)}Z_{(n)}$ group, wherein n is 1, 2, or 3, and Z is OH, CN, Cl, a $C_1$ to $C_5$ alkoxy group, a phenyl group or a methoxyphenyl group, or Z is $(CH_2)_d COOR$ where d=0 to 4, and R is H or a $C_1$ to $C_{20}$ alkyl group.

The reaction mixture also preferably includes from more than 0 up to 3 parts by weight per 100 parts by weight of component A) of an amine of the formula:

where R is a $C_3$ to $C_{10}$ straight or branched alkylene group or a $C_4$ to $C_{15}$ alicyclic group. This amine component is preferably used in an amount of from 0.05 to 2.5 parts by weight, more preferably from 0.25 to 2.0 parts by weight, and most preferably in an amount of from 0.5 to 1.5 parts by weight.

The reaction mixture also preferably contains from more than 0 to 40% by weight of a relatively high molecular weight compound containing at least two primary amine groups. This relatively high molecular weight compound is preferably used in an amount of from 0.5 to 40% by weight, more preferably from 2.5 to 20% by weight, and most preferably from 5 to 15% by weight based on the weight of component A).

The preferred and most preferred ranges produce foams of the best overall physical properties.

Component A) of the claimed invention must include a so-called filled polyol. Such polyols include a) dispersions of polyureas and/or polyhydrazodicarbonamides in relatively high molecular weight organic compounds containing at least two hydroxyl groups, b) polymer polyols prepared by polymerizing an ethylenically unsaturated monomer or monomers in relatively high molecular weight organic compounds containing at least two hydroxyl groups, and, c) mixtures thereof. These "filled" polyols are known and can be characterized as hydroxyl containing compounds which contain high molecular weight polyadducts, polycondensates or polymers in finely dispersed or dissolved form. Such polyethers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in German Auslegeschriften 1,168,075 and 1,260,142 and in German Offenlegungsschriften 2,324,134, 2,423,984, 2,512,385, 2,513,815, 2,550,796, 2,550,797, 2,550,833, 2,550,862, 2,633,293, and 2,639,254. See also U.S. Pat. Nos 3,325,421, 4,042,537, 4,089,835, 4,293,470, 4,296,213, 4,374,209 and 4,786,706, the disclosures of which are herein incorporated by reference. Polyols of this type are commercially available from Mobay Corporation and Bayer AG. Also useful are the so-called polymer polyols obtained by polymerizing one or more ethylenically unsaturated monomers in a hydroxy group containing compound. Such polymer polyols are described in U.S. Pat. Nos. 3,383,351, 3,304,273, 3,523,093, 3,110,685 and U.S. Pat. Nos. RE 28,715 and 29,118, the disclosures of which are herein incorporated by reference. Polymer polyols are commercially available from Bayer AG, BASF, and Union Carbide. Regardless of the filled polyol used herein, it is generally preferred to use polyols containing primary hydroxyl groups.

Component A) can also contain one or more polyether polyols having hydroxyl functionalities of from 2 to 3. Such polyether polyhydroxyl compounds have hydroxyl functionalities of from 2 to 3, and generally have molecular weights of from about 1000 to about 10,000, and preferably from about 2000 to about 6000. Such polyethers are generally known in the art. These polyethers may be obtained by polymerizing epoxides, such as ethylene oxide, propylene oxide, butylene oxide, tetrahydrofuran, styrene oxide or epichlorohydrin in the presence of Lewis catalysts such as $BF_3$. Polymerization may also be accomplished by the addition of epoxides (preferably ethylene and/or propylene oxide) either in admixture or successively, to compounds containing reactive hydrogen atoms such as water or alcohols. Examples of suitable reactive compounds include ethylene glycol, 1,3- and 1,2-propylene glycol, trimethylol propane, glycerol and the like. Regardless of the specific polyether used herein, it is generally preferred to use polyethers containing primary hydroxyl groups.

The reaction mixture herein must also contain water, preferably as the sole blowing agent. Although not preferred, other blowing agents may be used in combination with the water.

If other blowing agents are used they are typically readily volatile organic substances. Suitable organic blowing agents include, for example, acetone, ethyl acetate and halogen substituted alkanes such as methylene chloride, chloroform, ethylidene chloride, vinyl idene chloride, monofluorotrichloromethane, chlorodifluoromethane, and dichlorodifluoromethane as well as butane, hexane, heptane and diethyl ether. In addition, compounds which decompose at temperatures above room temperature to release gases such as nitrogen, e.g., azo compounds such as azoisobutyric acid nitrile, can be used. Further examples of blowing agents and the use of blowing agents are known and have been described, e.g., in Kunststoff-Handbuch, Volume VII, published by Vieweg and Hochtlen, Carl-Hanser-Verlag, Munich 1966, e.g., on pages 108 and 109, 432 to 455 and 507 to 510. If blowing agents in addition to water are used, they are used in amounts of from about 0.1 to about 15% by weight based on the weight of component A).

The isocyanate C) used herein is toluene diisocyanate. Toluene diisocyanate is available in several forms including the pure 2,4-isomer, the pure 2,6-isomer, as well as various mixtures of the two isomers. Two commercially available mixtures are mixtures of the 2,4- and 2,6-isomers in weight ratios of 65:35 and 80:20.

Catalysts which will catalyze the reaction between an lo isocyanate group and an isocyanate reactive group are also essential herein. They are used in catalytically effective amounts, typically in the range of from 0.001 to 10% by weight and preferably from about 0.005 to about 1.5% by weight based on the amount of component A). The catalysts used are generally known and include tertiary amines such as triethylamine, tributylamine, N-methylmorpholine, N-ethylmorpholine, N-cocomorpholine, N,N,N',N''-tetramethylethylenediamine, 1,4-diaza-bicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'tetramethyl-1,3-butane-diamine, N,N-dimethyl-$\beta$-phenylethylamine, 1,2-dimethyl-imidazole, 2-methylimidazole and the like. Also useful are the commercially available tertiary amines such as Niax A1 and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Examples of catalysts which consist of tertiary amines having hydrogen atoms which are reactive with isocyanate groups include triethanolamine, triisopropanolamine, N-methyldiethanolamine, N-ethyl-diethanolamine, N,N-dimethylethanolamine and their reaction products with alkylene oxides such as propylene oxide and/or ethylene oxide. Silaamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylaminoethyl-tetramethyldisoloxane. Basic nitrogen compounds such as tetraalkyl-ammonium hydroxides, alkali metal hydroxides such as sodium phenolate and alkali metal alcoholates such as sodium methylate may also be used as catalysts. Hexahydrotriazines are also suitable catalysts.

Organic metal compounds may also be used as catalysts according to the invention, although it is preferred to not use organic metal catalysts. Organic tin compounds are useful and include tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate.

Further examples of catalysts which may be used according to the invention and details concerning the activity of the catalysts are known and are described, e.g., in Kunststoff-Handbuch, Volume VII, published by Vieweg and Hochtlen, Carl-Hanser-Verlag, Munich 1966, pages 96 to 102.

An essential component of the reaction mixture is the N-hydroxyalkyl quaternary ammonium salt. It is generally used in an amount of from about 0.05 to about 2.0 parts by weight, preferably from 0.05 to 1.0 parts, and most preferably from 0.3 to 0.7 parts per 100 parts by weight of component A). The N-hydroxyalkyl quaternary ammonium salts useful herein are known and are described in U.S. Pat. Nos. 4,040,992 and 4,582,861, the disclosures of which are herein incorporated by reference. The salts correspond to the following general formula:

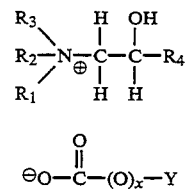

wherein
x is 0 or 1,
$R_1$, $R_2$, and $R_3$ are independently $C_1$ to $C_{20}$ alkyl or hydroxyalkyl groups, $C_3$ to $C_8$ cycloalkyl groups, $C_7$ to $C_{20}$ aralkyl groups, $C_6$ to $C_{20}$ aryl groups, $C_2$ to $C_{20}$ alkenyl groups, or $C_2$ to $C_6$ alkenyl groups, or,
$R_1$, $R_2$, and $R_3$ together constitute a heterocyclic structure from the group consisting of triethylene diamine, methyl triethylene diamine, quinuclidine, N-methyl morpholine, N-ethyl morpholine, and N'N'-dimethyl piperazine,
$R_4$ is H, phenyl, a $C_1$ to $C_{15}$ alkyl group, a $C_2$ to $C_{15}$ alkenyl group, a $C_2$ to $C_6$ alkenyl group, a $C_1$ to $C_9$ hydroxyalkyl group, a keto alkyl group having a total of 3 to 15 carbon atoms, or an alkoxylalkyl group having a total of 2 to 20 carbon atoms,
Y is H, a $C_1$ to $C_{20}$ alkyl group, a $C_2$ to $C_{15}$ alkenyl group, a $C_3$ to $C_6$ cycloalkyl group, phenyl, an alkyl phenyl having 1 to 9 carbon atoms in the alkyl group, benzyl, an alkyl benzyl having 1 to 9 carbon atoms in the alkyl group, or a $CH_{(3-n)}Z_{(n)}$ group,
wherein n is 1, 2, or 3, and Z is OH, CN, Cl, a $C_1$ to $C_5$ alkoxy group, a phenyl group or a methoxyphenyl group, or Z is $(CH_2)_d COOR$ where d=0 to 4, and R is H or a $C_1$ to $C_{20}$ alkyl group.

In the presently preferred salts, x=0 and Y represents hydrogen, a $C_1$ to $C_{18}$ alkyl group, a $C_2$ to $C_{15}$ alkenyl group, benzyl or methoxybenzyl. The most preferred salts are where $R_1$, $R_2$, $R_3$, and $R_4$ each represent methyl, x is 0, and Y is either H or 3-heptyl.

As noted above, the reaction mixture also preferably contains from more than 0 up to 3 parts by weight per 100 parts by weight of component A) of an amine of the formula:

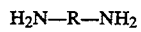

$H_2N$—R—$NH_2$ where R is a $C_3$ to $C_{10}$ straight or branched alkylene group or a $C_4$ to $C_{15}$ alicyclic group. This amine component is preferably used in an amount of from 0.05 to 2.5 parts by weight, more preferably from 0.25 to 2.0 parts by weight, and most preferably in an amount of from 0.5 to 1.5 parts by weight. Useful amines are known in the art. Dupont has recently introduced an amine sold as Dytek A amine for a variety of uses. The Dytek A amine is described as 2-methylpehtamethylenediamine. Additionally, the use of such amines in combination with polyamines and polyether polyols for the production of flexible foams is described in U.S. Pat. No. 4,876,292 and in U.S. patent application Ser. Nos. 569,683 filed Aug. 20, 1990 and 417,934 filed Oct. 6, 1989. Specific useful diamines include the various straight and branched chain isomers of diaminopropane, diaminobutane, diaminopentane, diaminohexane, diaminoheptane, diaminooctane, diaminononane, and diaminodecane. Specific useful diamines include 1,2- and 1,3-diaminopropane; 1,3-, 2,3-, and 1,4-diaminobutane; 1,2-diamino-2-methylpropane; 1,5-diaminopentane; 1,4-diamino-1-methylbutane; 1,4-diamino-2-methylbutane; 1,3-diamino-1-ethylpropane; 1,3-diamino-1,1-dimethylpropane; 1,3-diamino-1,2-dimethylpropane; 1,3-diamino-2,2-dimethylpropane; 1,5-diamino-2-methylpentane; 1,6-diaminohexane and the like. Useful alicyclic diamines include the various isomers of diaminocyclobutane, diaminocyclopentane, diaminocyclohexane, diaminocycloheptane, diaminocyclooctane, and diaminocyclononane. Also useful are the diamino-1-methylcyclohexanes; the methylenebis(cyclohexylamines); the diamino-1-methylcyclopentanes; the diaminodimethylcyclohexanes; isophorone diamine; and the like. It is presently preferred to use those diamines where R is a branched chain alkylene group. The most preferred material is 1,5-diamino-2-methylpentane.

As noted above, the reaction mixture may also include from more than 0 to 40% by weight of a relatively high molecular weight compound containing at least two primary amine groups. Such high molecular weight amines are preferably used in an amount of from 0.5 to 40% by weight, more preferably from 2.5 to 20% by weight, and most preferably from 5 to 15% by weight based on the amount of component A).

The high molecular weight amines preferably used herein are relatively high molecular weight compounds containing at least two primary amine groups, which may be aromatically or aliphatically bound. In the case of aromatically bound amines, the molecular weight of the aromatic primary amine used herein depends upon the particular type of foam being produced, but is generally from 300 to 10,000, and is preferably from 500 to 6000. The aromatic primary amine contains at least two aromatically bound primary amine groups and preferably contains from 2 to 4 aromatically bound primary amine groups. The aromatic primary amine compound can be of substantially any structure as long as it contains no substituents which undesirably interfere with the isocyanate/amine reaction. Especially preferred are polyamines prepared by hydrolyzing isocyanate compounds having isocyanate group contents of from 0.5 to 40% by weight. The most preferred polyamines are prepared by first reacting a polyether containing two to four hydroxyl groups with an excess of an aromatic polyisocyanate to form an isocyanate terminated prepolymer and then converting the isocyanate groups to amine groups by hydrolysis. Processes for the production of useful polyamines via isocyanate hydrolysis techniques are known and are described in U.S. Pat. Nos. 4,386,318, 4,456,730, 4,472,568, 4,501,873, 4,515,923, 4,525,534, 4,540,720, 4,578,500 and 4,565,645, European Patent 0,097,299 and German Offenlegungsschrift 3,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595. In the event that a basic material is used during the hydrolysis of the amine which would act as a trimerization catalyst, and if that basic material is not removed once the hydrolysis reaction is complete then an acidic material, such as, benzoyl chloride, should be added either before or shortly after addition of the amine to the isocyanate.

Also useful are compounds prepared by reacting the corresponding polyol with a halogenated nitrobenzene compound such as o- or p-nitrochlorobenzene, or dinitrochlorobenzene, followed by the reduction of the nitro group(s) to (he amine, as described in U.S. application Ser. No. 183,556, filed on Apr. 19, 1988 and in published European Patent Application 0,268,849, published Jun. 1, 1988. Also useful are the amines prepared by reacting a polyol with an acetoacetate and thereafter with an amine as described in U.S. application Ser. Nos. 523,769 and 524,268, both filed on May 15, 1990, and 562,293, filed on Aug. 3, 1990.

The most preferred aromatic polyamines contain from 2 to 4 amino groups and have molecular weights of from 350 to 6000.

Instead of, or, in addition to the high molecular weight amines noted above, polyoxyalkylene polyamines having molecular weights of form about 400 to about 5000, and having form 2 to 3 primary amine groups can be used. Such polyamines are known in the art. One method for preparing such amines is the amination of polyhydroxy polyethers (e.g., polypropylene glycols) by a reaction with ammonia in the presence of Raney nickel and hydrogen (Belgian patent 634,741). U.S. Pat. No. 3,654,370 discloses the preparation of polyoxyalkylene polyamines by the reaction of the corresponding polyol with ammonia and hydrogen in the presence of a nickel, copper, or chromium catalyst. The preparation of polyethers containing amino end groups by the hydrogenation of cyanoethylated polyoxyalkylene ethers is described in German Patent 1,193,671. Other methods of preparation of polyoxyalkylene polyamines are described in U.S. Pat. Nos. 3,155,728 and 3,236,895, and French Patent 1,551,605. Commercially available polyether polyamines are sold by Texaco under the Jeffamine tradename.

Surface active additives such as emulsifiers and foam stabilizers may also be used according to the invention. Suitable emulsifiers include, e.g., the sodium salts of ricinoleic sulphonates or salts of fatty acids with amines such as oleic acid diethylamine or stearic acid diethanolamine. Alkali metal or ammonium salts of sulphonic acids such as dodecylbenzene sulphonic acid or dinaphthylmethane disulphonic acid or of fatty acids such as ricinoleic acid or of polymeric fatty acids may also be used as surface active additives.

Polyether siloxanes are particularly suitable foam stabilizers, especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834,748, 2,917,480 and 3,629,308. It may, however, be advantageous to carry out the process according to the invention without foam stabilizers.

Other additives which may also be used according to the invention include reaction retarders, e.g., substances which are acid in reaction such as hydrochloric acid or organic acid halides, cell regulators such as paraffins or fatty alcohols or dimethyl polysiloxanes, pigments, dyes, flame retarding agents such as tris-chloroethyl phosphate, tricresyl phosphate or ammonium phosphate and polyphosphates, stabilizers against ageing and weathering, plasticizers, fungistatic and bacteriostatic substances, and fillers such as barium sulphate, kieselguhr, carbon black or whiting.

Other examples of surface active additives, foam stabilizers, cell regulators, reaction retarders, stabilizers, flame retarding substances, plasticizers, dyes, fillers, and fungistatic and bacteriostatic substances which may be used according to the invention and details concerning the use and mode of these additives are known and may be found, e.g., in Kunststoff-Handbuch, Volume VII, published by Vieweg and Hochtlen, Carl-Hanser-Verlag, Munich 1966, on pages 103 to 113.

According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich, 1966, pages 121 and 205.

According to the invention, the foaming reaction for producing foam products is often carried out inside molds. In this process, the foamable reaction mixture is introduced into a mold which may be made of a metal such as aluminum or a plastics material such as an epoxide resin. The reaction mixture foams up inside the mold to produce the shaped product. The process of foaming in molds is carried out to produce a product having a cellular structure on its surface. According to the invention, the desired result can be obtained by introducing just sufficient foamable reaction mixture to fill the mold with foam after the reaction is completed.

So-called external mold release agents known in the art, such as silicone waxes and oils, are frequently used when foaming is carried out inside the molds. The process may also be carried out with the aid of so-called internal mold release agents, if desired, in combination with external mold release agents, e.g., described in German Offenlegungsschriften 2,121,670 and 2,307,589.

Cold setting foams may also be produced, as described in British Patent 1,162,517 and German Offenlegungsschrift 2,153,086.

Foams may, of course, also be produced by the process of block foaming or by the laminator process known in the art. The products obtainable according to the invention may be used, for example, as upholstery or padding materials.

The invention is further illustrated but is not intended to be limited by the following examples in which all parts and percentages are by weight unless otherwise specified.

EXAMPLES

In the examples which follow, the following materials were used:

POLYOL A: a dispersion having an OH number of about 28 and consisting of a polyhydrazodicarbonamide in a glycerine initiated propylene oxide/ethylene oxide polyether with an OH number of 35, and produced by reacting toluene diisocyanate and hydrazine hydrate in the presence if the polyether, according to U.S Pat. No. 4,042,537. The dispersion has a solids content of 20% by weight.

POLYOL B: a glycerine-initiated propylene oxide/ethylene oxide polyether (weight ratio of PO to EO of about 7:1) having an OH number of about 35.

POLYOL C: a glycerine-initiated propylene oxide/ethylene oxide polyether (weight ratio of PO to EO of about 5:1) having an OH number of about 35.

POLYOL D: a propylene glycol-initiated propylene oxide/ethylene oxide polyether (weight ratio of PO to EO is about 7:1) having an OH number of about 28.

POLYAMINE A: a amine prepared by reacting POLYOL C with TD80 to produce an isocyanate terminated prepolymer and thereafter hydrolyzing the isocyanate groups to the corresponding amine; the final product has an amine number of about 30.

POLYAMINE B: (D2000) Jeffamine D2000, a 2000 molecular weight polypropylene oxide diamine, available from Texaco.

POLYAMINE C: (T5000) Jeffamine T-5000, a 5000 molecular weight trifunctional primary amine terminated polyether, available from Texaco.

H20: water

AMINE: Dytek A, 2-methylpentamethylene diamine, available from DuPont.

TMR: a 75:25 blend of trimethyl-2-hydroxypropyl ammonium 2-ethyl hexanoate in diethylene glycol, available from Air Products.

A4: Niax A-1, bis(2-dimethylaminoethyl)ether, available from Union Carbide.

33LV: Dabco 33LV, a 33% solution of triethylenediamine in dipropylene glycol, available from Air Products.

A107: a 70:30 blend of the 2-ethyl hexanoic acid salt of Al in dipropylene glycol, available from Union Carbide.

A4: Niax A-4, a tertiary amine catalyst, available from Union Carbide.

PC41: Polycat 41, 1,3,5-tris(dimethylaminopropyl)-hexahydro-s-triazine, available from Air Products K15: Dabco K-15, potassium acetate, available from Air Products.

DC5243: a siloxane surfactant available from Dow Corning.

DEOA: diethanolamine containing 15% by weight water.

A1/33LV: a 1:8 mixture of A1 and 33LV.

TD80: an 80/20 mixture of 2,4-toluene diisocyanate and 2,6-toluene diisocyanate. in the examples, the components of the B-side were accurately weighed into a suitable container and mixed using an air driven two blade mixer. The resultant mixture was then taken to the metering equipment. The metering equipment was flushed with the mixture and calibrated for the desired foam index.

The mixture was mixed with the isocyanate using high pressure metering equipment (Hennecke HK1000) and a Hennecke MQ-12-2 self cleaning mixhead. Process settings were as follows:

| | |
|---|---|
| Temperature Mix/Iso: | 80° F./80° F. |
| Mix Pressures Mix/Iso: | 2300 psi/1500 psi |
| Mold Temp: | 140–150° F. |
| Mold Release: | Park 798, available from Park Chemical |
| Demold time: | 3 minutes |

The reaction mixture was metered into a 15 inch×15 inch ×4.5 inch mold which had been sprayed with the mold release in an amount sufficient to give the desired density. The mold was then closed and the foam part demolded after the reaction was complete. The parts were hand crushed upon demold. The parts were then cured at 250° F. for 30 minutes and then submitted for testing (ASTM D-3574, and in the case of Wet Compressive set, JASO M 304-85). For the compression set data tested according to ASTM D-3574, 2A is the original foam, while 2E is the foam humid aged according to the test procedure. In general, in evaluating a flexible foam, the lower the compression set data, the better the foam.

The formulations used and the results obtained were as reported in the following examples (all amounts are in parts by weight).

EXAMPLES 1-5

| | | | | | |
|---|---|---|---|---|---|
| POLIO A | 50 | | | | |
| POLIO C | 50 | | | | |
| Water (Total) | 3.3 | | | | |
| Water (Added) | 3.1 | | | | |
| TM | .3 | | | | |
| A1/33LV | .75 | | | | |
| DC 5243 | 2.0 | | | | |
| Example | 1 | 2 | 3 | 4 | 5 |
| Index | 90 | 100 | 90 | 100 | 110 |
| Density (PCF) | 2.2 | 2.2 | 2.65 | 2.6 | 2.7 |
| ILD 65% R (N) | 265 | 323 | 371 | 454 | 554 |
| Tensile (kPa) | 158 | 167 | 207 | 212 | 215 |
| Tear | | | | | |
| Trouser (N/m) | 285 | 265 | 346 | 312 | 271 |
| Die C (N/m) | 730 | 761 | 915 | 874 | 833 |
| Elongation (%) | 185 | 162 | 187 | 159 | 129 |
| Comp. Set 50% 2A (Cd, %) | 15.1 | 11.9 | 15.0 | 12.4 | 10.1 |
| Comp. Set 50% 2E (Cd, %) | 21.5 | 25.4 | 24.6 | 24.8 | 25.1 |
| Comp. Set 75% 2A (Cd, %) | 17.7 | 11.3 | 13.0 | 10.9 | 9.2 |
| Wet Comp. Set (Cd, %) | 39 | 31.5 | 33.8 | 28.1 | 24.1 |

EXAMPLES 6-11

| | | | | | | |
|---|---|---|---|---|---|---|
| POLIO A | 75 | | | | | |
| POLIO C | 25 | | | | | |
| Water (Total) | 3.3 | | | | | |
| Water (Added) | 3.0 | | | | | |
| TMR | .45 | | | | | |
| A1/33LV | .75 | | | | | |
| DC 5243 | 2.0 | | | | | |
| Example | 6 | 7 | 8 | 9 | 10 | 11 |
| Index | 90 | 100 | 110 | 90 | 100 | 110 |
| Density (PCF) | 2.23 | 2.16 | 2.21 | 2.64 | 2.65 | 2.65 |
| ILD 65% R (N) | 306 | 365 | 418 | 442 | 513 | 581 |
| Tensile (kPa) | 175 | 160 | 172 | 221 | 224 | 227 |
| Tear | | | | | | |
| Trouser (N/m) | 353 | 264 | 265 | 418 | 384 | 321 |
| Die C (N/m) | 805 | 700 | 665 | 1068 | 1024 | 875 |
| Elongation (%) | 188 | 128 | 139 | 163 | 158 | 125 |
| Comp. Set 50% 2A (Cd, %) | 20.1 | 20.6 | 15.1 | 20.6 | 18.9 | 16.8 |
| Comp. Set 50% 2E (Cd, %) | 29.4 | 42.6 | 50.8 | 32.6 | 33.5 | 51.1 |
| Comp. Set 75% 2A (Cd, %) | 16.4 | 18.6 | 36.6 | 17.0 | 16.7 | 21.7 |
| Wet Comp. Set (Cd, %) | 38.7 | 24.9 | 37.6 | 37.5 | 39.5 | 35.9 |

Processing Comments: Good cure at all indexes with a 3 minute demold. Open foam, especially at 110 index.

EXAMPLES 12-17

| | | | | | | |
|---|---|---|---|---|---|---|
| POLIO A | 75 | | | | | |
| POLIO C | 25 | | | | | |
| Water (Total) | 3.3 | | | | | |
| Water (Added) | 2.65 | | | | | |
| DEOA | 2.35 | | | | | |
| 33LV | .35 | | | | | |
| A107 | .35 | | | | | |
| A4 | .45 | | | | | |
| DC 5243 | 2.0 | | | | | |
| Example | 12 | 13 | 14 | 15 | 16 | 17 |
| Index | 90 | 100 | 110 | 90 | 100 | 110 |
| Density (PCF) | 2.23 | 2.2 | 2.2 | 2.63 | 2.63 | 2.65 |
| ILD 65% R (N) | 273 | 346 | 456 | 370 | 478 | 659 |
| Tensile (kPa) | 156 | 154 | 170 | 177 | 198 | 218 |
| Tear | | | | | | |
| Trouser (N/m) | 207 | 208 | 188 | 238 | 247 | 212 |
| Die C (N/m) | 618 | 594 | 582 | 712 | 755 | 707 |
| Elongation (%) | 120 | 113 | 89 | 129 | 117 | 91 |
| Comp. Set 50% 2A (Cd, %) | 15.0 | 12.4 | 9.2 | 14.4 | 10.7 | 9.3 |
| Comp. Set 50% 2E (Cd, %) | 52.7 | 29.6 | 19.4 | 55.2 | 22.5 | 19.4 |
| Comp. Set 75% 2A (Cd, %) | 14.1 | 11.4 | 9.2 | 13.3 | 9.8 | 8.9 |
| Wet Comp. Set (Cd, %) | 33.0 | 29.0 | 24.0 | 31.0 | 28.5 | 21.5 |

EXAMPLES 18-22

| | | | | | |
|---|---|---|---|---|---|
| POLIO A | 50 | | | | |
| POLIO C | 50 | | | | |
| Water (Total) | 3.3 | | | | |
| Water (Added) | 2.75 | | | | |
| DEOA | 2.35 | | | | |
| 33LV | .35 | | | | |
| A107 | .35 | | | | |
| A4 | .45 | | | | |
| DC 5243 | 1.75 | | | | |
| Example | 18 | 19 | 20 | 21 | 22 |
| Index | 90 | 100 | 90 | 100 | 110 |
| Density (PCF) | 2.3 | 2.3 | 2.63 | 2.65 | 2.7 |
| ILD 65% R (N) | 264 | 359 | 367 | 484 | 596 |
| Tensile (kPa) | 113 | 130 | 151 | 160 | 166 |
| Tear | | | | | |
| Trouser (N/m) | 186 | 199 | 203 | 194 | 179 |
| Die C (N/m) | 509 | 593 | 640 | 633 | 625 |
| Elongation (%) | 111 | 106 | 122 | 100 | 89 |
| Comp. Set 50% 2A (Cd, %) | 10.0 | 9.6 | 11.0 | 7.4 | 8.4 |
| Comp. Set 50% 2E (Cd, %) | 26.1 | 22.1 | 23.1 | 19.0 | 20.9 |
| Comp. Set 75% 2A (Cd, %) | 9.0 | 7.4 | 9.25 | 6.7 | 8.5 |
| Wet Comp. Set (Cd, %) | 22.4 | 19.0 | 18.5 | 16.5 | 16.1 |

Processing Comments: Cure fair at 3 minutes a 2.5 PCF but poor at 2.1 PCF.

EXAMPLES 23-28

-continued

| | |
|---|---|
| POLIO A | 50 |
| POLIO D | 41 |
| POLY-AMINE C | 9 |
| AMINE | .5 |
| Water (Total) | 3.3 |
| Water Added | 3.1 |
| TMR | .4 |
| A1/33LV | .65 |
| DC 5243 | 2.0 |

| Example | 23 | 24 | 25 | 26 | 27 | 28 |
|---|---|---|---|---|---|---|
| Index | 90 | 100 | 110 | 90 | 100 | 110 |
| Density (PCF) | 2.21 | 2.13 | 2.12 | 2.57 | 2.45 | 2.49 |
| ILD 65% (N) | 222 | 272 | 327 | 286 | 349 | 417 |
| Tensile (kPa) | 183 | 174 | 157 | 224 | 206 | 213 |
| Tear Trouser (N/m) | 415 | 376 | 306 | 456 | 437 | 359 |
| Die C (N/m) | 751 | 822 | 758 | 956 | 1025 | 893 |
| Elongation (%) | 246 | 195 | 145 | 268 | 194 | 155 |
| Comp. Set 50% 2A (Cd, %) | 29.1 | 17.3 | 15.7 | 28.0 | 17.1 | 16.2 |
| Comp. Set 50% 2E (Cd, %) | 30.8 | 28.5 | 43.2 | 25.7 | 29.2 | 49.3 |
| Comp. Set 75% 2A (Cd, %) | 65.1 | 19.3 | 14.6 | 49.9 | 22.7 | 22.9 |
| Wet Comp. Set (Cd, %) | 44 | 41 | 39 | 44 | 41 | 40 |

Processing Comments: Good cure at all indexes with a 3 minute demold, 4 minutes at 110 index. Foams were semi tight and more difficult to crush.

EXAMPLES 29–34

| | |
|---|---|
| POLIO A | 50 |
| POLIO C | 40 |
| Water (Total) | 3.3 |
| Water Added | 3.1 |
| TMR | .3 |
| A1/33LV | .65 |
| DC 5243 | 2.0 |
| POLY-AMINE B | 10 |
| AMINE | 1.0 |

| Example | 29 | 30 | 31 | 32 | 33 | 34 |
|---|---|---|---|---|---|---|
| Index | 90 | 100 | 110 | 90 | 100 | 110 |
| Density (PCF) | 2.23 | 2.15 | 2.19 | 2.68 | 2.62 | 2.64 |
| ILD 65% R (N) | 296 | 359 | 429 | 403 | 510 | 596 |
| Tensile (kPa) | 162 | 154 | 156 | 215 | 208 | 214 |
| Tear Trouser (N/m) | 308 | 250 | 229 | 382 | 300 | 262 |
| Die C (N/m) | 683 | 648 | 613 | 875 | 832 | 718 |
| Elongation (%) | 165 | 124 | 116 | 189 | 144 | 118 |
| Comp. Set 50% 2A (Cd, %) | 20.1 | 13.0 | 11.6 | 17.9 | 11.9 | 11.5 |
| Comp. Set 50% 2E (Cd, %) | 50.8 | 35.5 | 48.0 | 32.3 | 39.4 | 43.1 |
| Comp. Set 75% 2A (Cd, %) | 15.8 | 9.7 | 10.8 | 14.5 | 9.9 | 10.0 |
| Wet Comp. Set (Cd, %) | 33.3 | 29.4 | 26.2 | 31.1 | 25.6 | 25.6 |

Processing Comments: Good cure at all indexes with a 3 minute demold open foam. Parts are crushed easily.

EXAMPLES 35–40

| | |
|---|---|
| POLIO A | 50 |
| POLIO C | 41 |
| POLY-AMINE C | 9 |
| AMINE | .5 |
| Water (Total) | 3.3 |
| Water Added | 3.1 |
| A1/33LV | .65 |
| TMR | .4 |
| DC 5243 | 1.0 |

| Example | 35 | 36 | 37 | 38 | 39 | 40 |
|---|---|---|---|---|---|---|
| Index | 90 | 100 | 110 | 90 | 100 | 110 |
| Density (PCF) | 2.16 | 2.15 | 2.20 | 2.58 | 2.62 | 2.60 |
| ILD 65% R (N) | 256 | 296 | 375 | 372 | 437 | 523 |
| Tensile (kPa) | 141 | 152 | 149 | 176 | 183 | 188 |
| Tear Trouser (N/m) | 295 | 250 | 243 | 382 | 340 | 305 |
| Die C (N/m) | 712 | 697 | 800 | 913 | 900 | 851 |
| Elongation (%) | 171 | 144 | 126 | 164 | 144 | 141 |
| Comp. Set 50% 2A (Cd, %) | 12.3 | 11.0 | 9.0 | 11.8 | 10.0 | 8.8 |
| Comp. Set 50% 2E (Cd, %) | 27.0 | 27.1 | 24.0 | 20.5 | 22.2 | 25.5 |
| Comp. Set 75% 2A (Cd, %) | 12.5 | 9.7 | 7.7 | 9.9 | 7.9 | 7.1 |
| Wet Comp. Set (Cd, %) | 31 | 27.4 | 21.0 | 26.0 | 23.3 | 19.2 |

EXAMPLES 41–46

| | |
|---|---|
| POLIO A | 50 |
| POLIO B | 40 |
| POLY-AMINE A | 10 |
| Water (Total) | 3.3 |
| Water Added | 3.1 |
| AMINE | .5 |
| TMR | .3 |
| A1/33LV | .65 |
| DC 5243 | 1.0 |

| Example | 41 | 42 | 43 | 44 | 45 | 46 |
|---|---|---|---|---|---|---|
| Index | 90 | 100 | 110 | 90 | 100 | 110 |
| Density (PCF) | 2.20 | 2.20 | 2.24 | 2.64 | 2.58 | 2.68 |
| ILD 65% R (N) | 290 | 350 | 417 | 430 | 493 | 570 |
| Tensile (kPa) | 151 | 157 | 177 | 207 | 180 | 216 |
| Tear Trouser (N/m) | 359 | 287 | 247 | 405 | 339 | 253 |
| Die C (N/m) | 878 | 694 | 699 | 980 | 1010 | 777 |
| Elongation (%) | 164 | 133 | 123 | 167 | 133 | 115 |
| Comp. Set 50% 2A (Cd, %) | 14.4 | 12.0 | 10.0 | 14.2 | 11.1 | 10.9 |
| Comp. Set 50% 2E (Cd, %) | 24.0 | 25.0 | 25.6 | 19.5 | 23.0 | 24.0 |
| Comp. Set 75% 2A (Cd, %) | 13.5 | 11.0 | 9.0 | 13.1 | 9.4 | 8.6 |
| Wet Comp. Set (Cd, %) | 36 | 27 | 31 | 32 | 26.3 | 24.8 |

EXAMPLES 47–52

-continued

| | | |
|---|---|---|
| POLIO A | 75 | |
| POLIO C | 15 | |
| Water (Total) | 3.3 | |
| Water Added | 3.0 | |
| TMR | .45 | |
| A1/33LV | .65 | |
| DC 5243 | 2.0 | |
| POLYAMINE B | 10 | |
| AMINE | 1.0 | |

| Example | 47 | 48 | 49 | 50 | 51 | 52 |
|---|---|---|---|---|---|---|
| Index | 90 | 100 | 110 | 90 | 100 | 110 |
| Density (PCF) | 2.16 | 2.16 | 2.2 | 2.64 | 2.59 | 2.63 |
| ILD 65% R (N) | 327 | 392 | 474 | 477 | 548 | 660 |
| Tensile (kPa) | 170 | 177 | 162 | 245 | 242 | 230 |
| Tear Trouser (N/m) | 348 | 329 | 290 | 426 | 368 | 324 |
| Die C (N/m) | 805 | 823 | 718 | 1077 | 972 | 901 |
| Elongation (%) | 155 | 141 | 115 | 169 | 142 | 118 |
| Comp. Set 50% 2A (Cd, %) | 19.9 | 17.7 | 15.7 | 20.4 | 18.3 | 13.5 |
| Comp. Set 50% 2E (Cd, %) | 48.7 | 60.0 | 65.1 | 47.5 | 61.6 | 65.0 |
| Comp. Set 75% 2A (Cd, %) | 21.5 | 46.1 | 47.6 | 44.8 | 69.1 | 33.4 |
| Wet Comp. Set (Cd, %) | 42.5 | 42.7 | 39.0 | 42.1 | 41.1 | 38.2 |

Processing Comments: Good cure at all indexes at a 3 minute demold. Slightly tight at 90 index.

EXAMPLES 53–61

| | | | | | | | | | |
|---|---|---|---|---|---|---|---|---|---|
| POLYOL A | 50 | | | | | | | | |
| POLYOL C | 50 | | | | | | | | |
| Water (Total) | 3.3 | | | | | | | | |
| Water Added | 3.0 | | | | | | | | |
| A1/33LV | .75 | | | | | | | | |
| DC 5243 | 2.0 | | | | | | | | |
| TMR | .3 | | | | | | | | |
| PC41 | — | — | — | .2 | — | — | — | — | — |
| K15 | — | — | — | — | — | — | .25 | — | — |

| Example | 53 | 54 | 55 | 56 | 57 | 58 | 59 | 60 | 61 |
|---|---|---|---|---|---|---|---|---|---|
| Index | 90 | 100 | 110 | 90 | 100 | 110 | 90 | 100 | 110 |
| Density (PCF) (Calculated) | 2.5 | 2.5 | 2.5 | 2.5 | 2.5 | 2.5 | 2.5 | 2.5 | 2.5 |
| ILD 65% R (N) | 290 | 351 | 404 | 233 | 285 | 351 | 260 | 396 | 359 |
| Tensile (kPa) | 173 | 166 | 158 | 127 | 143 | 137 | 154 | 142 | 149 |
| Tear - Trouser (N/m) | 362 | 275 | 201 | 213 | 182 | 154 | 288 | 238 | 189 |
| Elongation (%) | 174 | 135 | 112 | 125 | 116 | 102 | 159 | 123 | 114 |
| Comp. Set 50% 2A (Cd, %) | 19.6 | 24.2 | 35.8 | 75.3 | 72.5 | 45.2 | 66.5 | 80.0 | 78.7 |
| Comp. Set 50% 2E (Cd, %) | 20.5 | 23.0 | 35.0 | 31.0 | 35.5 | 51.5 | 20.0 | 30.3 | 49.0 |

Note: Both the Polycat 41 and Dabco K15 foams processed somewhat tighter than did the TMR foams.

EXAMPLES 59 TO 61

The foams produced in these examples were not produced using the technique of Examples 1 through 52. The materials were weighed into a one half gallon jar and stirred for about 15 minutes with an air driven stirrer. The polyol formulations noted were then weighed (about 200 grams) into a quart paper container. A plastic container was then wet tared and the requisite amount of TD80 weighed. The isocyanate was then poured into the polyol formulation and vigorously stirred for 10 seconds. The mixture was then poured into a 10"×12"×3.5" heated mold (140° to 150° F.) and then demolded after three minutes. Upon demold, the foam samples were hand crushed, and then tested for the properties noted. Examples 56 through 61 are comparative examples and are not within the scope of the present invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flexible foam prepared by reacting:
   A) a polyol consisting of
      1) from 20 to 100% by weight of a polyol selected from the group consisting of:
         a) a dispersion of a polyurea and/or a polyhydrazodicarbonamide in a relatively high molecular weight organic compound containing at least two hydroxyl groups,
         b) a polymer polyol prepared by polymerizing an ethylenically unsaturated monomer or monomers in a relatively high molecular weight organic compound containing at least two hydroxyl groups, and
         c) mixtures thereof; and
      2) from 0 to 80% by weight of one or more polyether polyols having hydroxyl functionalities of from 2 to 3,
   said percents by weight being based on the combined weight of components and 2) and totalling 100%;
   B) water, in an amount of from about 1.5 to about 7 parts by weight per 100 parts by weight component A); and
   C) toluene diisocyanate, at an isocyanate index of from about 80 to 120; in the presence of
   D) a catalytic amount of a catalyst which will catalyze the reaction between an isocyanate group and an hydroxyl group;
   E) from about 0.05 to about 2.0 parts by weight, per 100 parts by weight of component A), of an N-hydroxylalkyl quaternary ammonium salt corresponding to the following general formula:

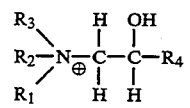

-continued $$\ominus O-\overset{O}{\underset{\|}{C}}-(O)_x-Y$$

wherein
x is 0,
$R_1$, $R_2$, $R_3$, and $R_4$ each represent methyl, and
Y is either hydrogen or 3-heptyl;
F) from about 0.54 to about 1.1 parts by weight, per 100 parts by weight of component A), of an amine of the formula:

H₂N—R—NH₂ where R is a $C_3$ to $C_{10}$ straight or branched alkylene group or a $C_4$ to $C_{15}$ alicyclic group; and
G) from about 9.8 to about 11.1% by weight, based on the amount of component A), of a compound containing at least two primary amine groups, and having a molecular weight of from about 300 to about 10,000.

2. A flexible foam as recited in claim 1, wherein R group of said amine component F) is a branched chain alkylene.

3. A flexible foam as recited in claim 1, wherein the components are used in the following amounts:
from 50 to 80% by weight of A)1),
from 20 to 50% by weight of A)2),
from 2.0 to 4.5 parts by weight of B),
from 0.001 to 10% by weight of D),
from 0.05 to 1.0 parts by weight of E),
and wherein the isocyanate index is from 90 to 110.

4. A flexible foam as recited in claim 3 wherein component E) is used in an amount of from 0.3 to 0.7 parts by weight.

5. An isocyanate reactive mixture comprising:
A) a polyol consisting of
1) from 20 to 100% by weight of a polyol selected from the group consisting of:
a) a dispersion of a polyurea and/or a polyhydrazodicarbonamide in a relatively high molecular weight organic compound containing at least two hydroxyl groups,
b) a polymer polyol prepared by polymerizing an ethylenically unsaturated monomer or monomers in a relatively high molecular weight organic compound containing at least two hydroxyl groups, and
c) mixtures thereof; and
2) from 0 to 80% by weight of one or more polyether polyols having hydroxyl functionalities of from 2 to 3,
said percents by weight being based on the combined weight of components 1) and 2) and totalling 100%;
B) water, in an amount of from about 1.5 to about 7 parts by weight per 100 parts by weight component A); and
D) a catalytic amount of a catalyst which will catalyze the reaction between an isocyanate group and an hydroxyl group;
E) from about 0.05 to about 2.0 parts by weight, per 100 parts by weight of component A), of an N-hydroxylalkyl quaternary ammonium salt corresponding to the following general formula:

$$\begin{array}{c} R_3 \quad H \quad OH \\ \diagdown \quad | \quad | \\ R_2-\overset{\oplus}{N}-\underset{|}{C}-\underset{|}{C}-R_4 \\ \diagup \quad | \quad | \\ R_1 \quad H \quad H \end{array}$$

$$\ominus O-\overset{O}{\underset{\|}{C}}-(O)_x-Y$$

wherein
x is 0,
$R_1$, $R_2$, $R_3$, and $R_4$ each represent methyl, and
Y is either hydrogen or 3-heptyl;
F) from about 0.54 to about 1.1 parts by weight, per 100 parts by weight of component A), of an amine of the formula:

H₂N—R—NH₂ where R is a $C_3$ to $C_{10}$ straight or branched alkylene group or a $C_4$ to $C_{15}$ alicyclic group; and
G) from about 9.8 to about 11.1% by weight, based on the amount of component A), of a compound containing at least two primary amine groups, and having a molecular weight of from about 300 to about 10,000.

6. An isocyanate reactive mixture as recited in claim 5, wherein R group of said amine component F) is a branched chain alkylene.

7. An isocyanate reactive mixture as recited in claim 5, wherein the components are used in the following amounts:
from 50 to 80% by weight of A)1),
from 20 to 50% by weight of A)2),
from 2.0 to 4.5 parts by weight of B),
from 0.001 to 10% by weight of D),
from 0.05 to 1.0 parts by weight of E),
and wherein the isocyanate index is from 90 to 110.

8. An isocyanate reactive mixture as recited in claim 7 wherein component E) is used in an amount of from 0.3 to 0.7 parts by weight.

* * * * *